April 16, 1957 F. A. POST ET AL 2,788,661
MODEL CATCHER FOR WIND TUNNEL
Filed Sept. 20, 1956 2 Sheets-Sheet 1

INVENTORS
JOHN C. VAUGHAN
FREDERICK A. POST
BY
ATTORNEY

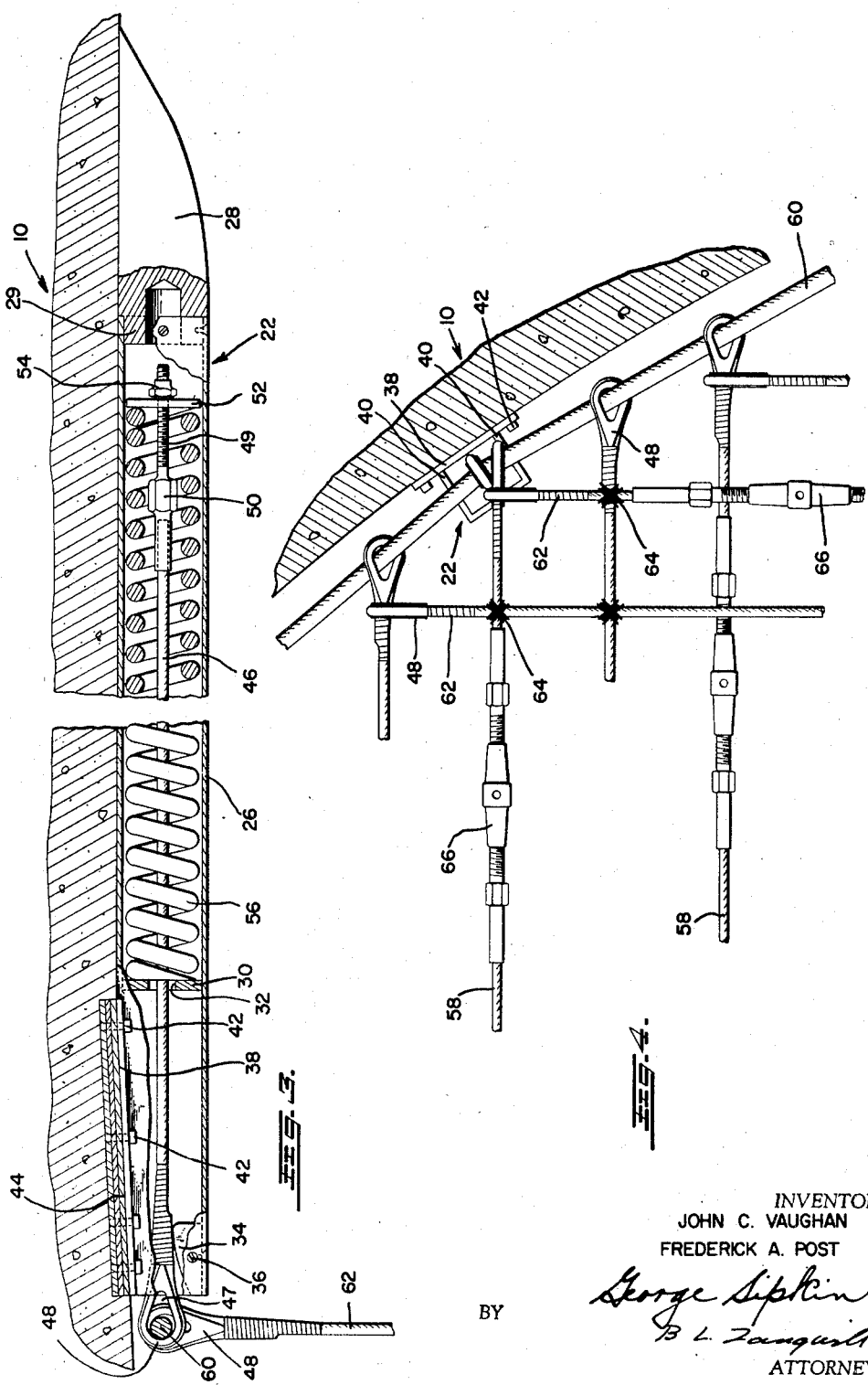

2,788,661
Patented Apr. 16, 1957

2,788,661

MODEL CATCHER FOR WIND TUNNEL

Frederick A. Post, Washington, D. C., and John C. Vaughan, Bethesda, Md., assignors to the United States of America as represented by the Secretary of the Navy Application September 20, 1956, Serial No. 611,086

5 Claims. (Cl. 73—147)

(Granted under Title 35, U. S. Code (1952), sec. 266)

The invention described herein may be manufactured and used by or for the Government of the United States of America for governmental purposes without the payment of any royalties thereon or therefor.

This invention relates to a model catcher screen, for use in a wind tunnel.

In wind tunnel operation, it is frequently the case that a model, or at least a portion thereof, breaks loose from its support during the course of testing the same; said dislocated model or portion thereof flying through the tunnel and damaging test apparatus contained in said tunnel, and/or the wind tunnel itself. A prior art method of preventing damage from dislocated models and/or portions thereof consists of a screen of cable or metal bars rigidly attached to the wind tunnel walls. Due to the rigid nature of the prior art screens and/or the rigid attachment of said screens to the walls of the wind tunnel, said prior art screens are incapable of stopping high-speed fragments without frequent failure thereof.

It is an object of this invention to overcome the disadvantages found in the prior art devices.

A further object of this invention is to provide a means for a wind tunnel for catching wind tunnel models and/or portions thereof that are dislocated during the operation of the wind tunnel.

Still another object of this invention is to provide a wind tunnel with resilient means for catching a model and/or portions thereof in the event that they are dislocated from their support during operation of said wind tunnel.

A further object is to provide an improved screen-like device across a wind tunnel for catching dislocated models and/or portions thereof during the operation of said wind tunnel.

Still a further object is to provide a wind tunnel with a screen for catching models or portions thereof that may become dislocated during operation of said wind tunnel; said screen being connected to the walls of the wind tunnel by shock absorbing means.

Additional objects and many of the attendant advantages of this invention will be readily appreciated as the same become better understood by reference to the following detailed description wherein:

Fig. 3 is a longitudinal sectional view, partially broken away, of a shock absorbing means utilized in accordance with this invention; and Fig. 4 is an enlarged view of a portion of the model catcher made in accordance with this invention, and showing details of construction thereof.

Figure 1:
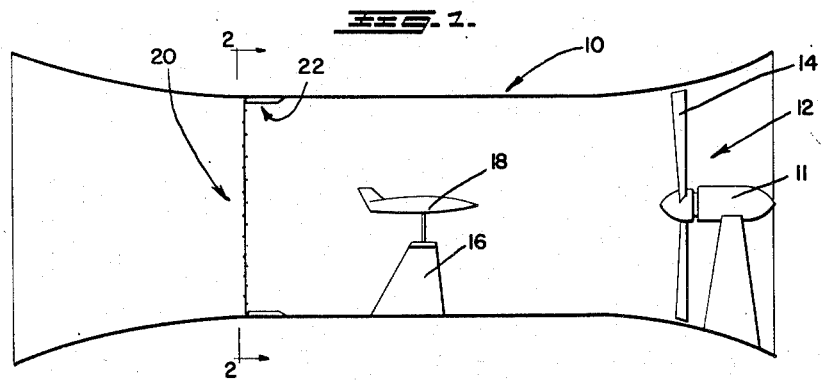
Fig. 1 is an elevational view of a wind tunnel modified in accordance with this invention.
Figure 2:
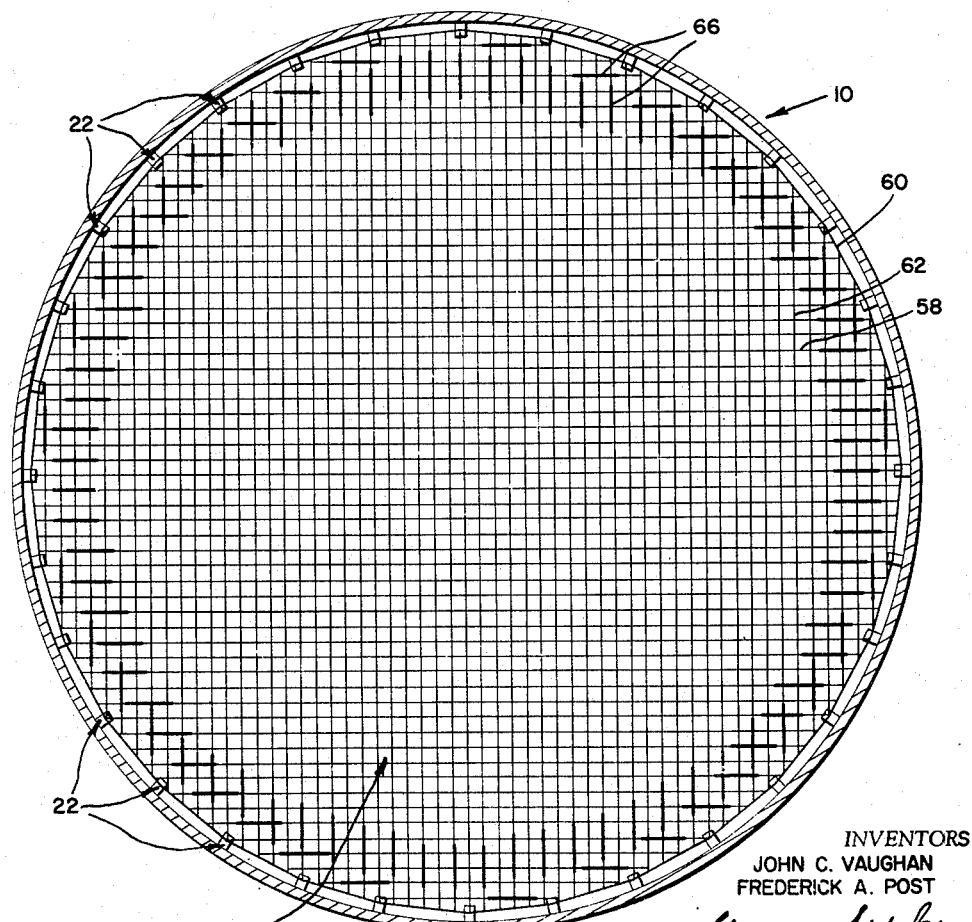
Fig. 2 is a sectional view taken on line 2—2 of Fig. 1 and drawn to an enlarged scale.

Referring now to the drawings, wherein like reference characters designate like or corresponding parts throughout the several views, there is shown in Fig. 1 a schematic, elevational view of a wind tunnel 10 modified in accordance with this invention. The wind tunnel 10 is of course provided with a conventional wind generating means 12 comprising, as for example, a motor 11 and a propeller means 14. In addition, the wind tunnel 10 is provided with a model supporting member 16, that is adapted to support a model 18.

In accordance with this invention the wind tunnel 10 is modified to the extent of placing a transversely extending model catcher apparatus 20 on the interior thereof, at a point downwind of the model supporting member 16. The model catcher apparatus 20 is anchored at its periphery to the inside walls of the wind tunnel 10 by attachment to a plurality of shock absorbers 22 that are bolted or otherwise affixed to the inside walls of said wind tunnel. The shock of either a model, or fragments thereof, striking the model catcher 20 is in turn transmitted to the shock absorbers 22 by virtue of the structure hereinafter described.

Each of the shock absorbers 22 (Figs. 1 and 3) extends longitudinally of the inner wall of the wind tunnel 10 and is located between the model catching apparatus 20 and the model 18. Each shock absorber 22 comprises a tubular housing 26 that is open at both ends. The right-hand end of the tubular housing 26, as viewed in Fig. 3, is provided with a plug 28, made of wood or the like, and streamlined so as to reduce the turbulence of air flow over the right-hand end of the shock absorber. The streamlined plug 28 has one end thereof 29 reduced in size, said end being fitted into the interior of the tubular housing 26. The exterior surfaces of said plug 28 are flush with the outer surfaces of the tubular housing 26. A transversely extending disc 30 is welded to the interior of the tubular housing 26, adjacent the left-hand end thereof, said disc 30 being provided with a hole 32 passing through the center thereof. To the left of the disc 30, at the open end of housing 26, is an anti-friction block 34 held in place by a screw or the like 36.

At the left-hand end of the tubular housing 26, one wall of said housing, that is, the wall adapted to be adjacent the inner surface of the wind tunnel, is cut away for a distance extending from said left-hand end toward the central portion of said tubular housing. The cut away portion of the housing 26 is replaced by a plate 38 that is substantially wider than the tubular housing; the plate 38 is at substantially right angles to the adjacent, side walls of the housing, and edges 40 of said side walls are welded to the plate 38. The plate 38 is provided with a series of bolt holes that pass therethrough and are adapted to receive bolts 42 that pass through said plate 38 and are adapted to be screwed into suitably threaded holes provided in a retaining ring 44 imbedded in the wall of the wind tunnnel 10. The shock absorber member 22 is fastened to the wall of the wind tunnel 10, by passing the bolts 42 through the holes in plate 38, and then screwing them into the holes provided in the ring 44.

A flexible cable 46 is located within the tubular housing 26 and passes through the hole 32 in disc 30. The cable 46 is provided with an eyelet 47 at one end thereof, formed by bending said end around a thimble 48 and splicing and/or soldering the free end of the cable to the body thereof. The eyelet 47 is at the left-hand end of the housing 26, and the remainder of the cable is located within said housing, extending toward the right-hand end thereof. An externally threaded terminal member 50 is soldered or otherwise fixedly connected to the right-hand end of the cable 46, and has a disc 52 movably mounted thereon. The disc 52 is adjustably held on terminal member 50 by a nut 54 mounted on the threaded portion of said terminal member.

A coil spring 56 surrounds the cable 46, within the housing 26, and is located between the discs 30 and 52. Since movement of spring 46 toward the left of housing member 26 is prevented by the fixed disc 30, said spring acts upon the cable 46, through the disc 52, nut 54 and the terminal member 50, to resist the withdrawal of said cable from the housing member 26.

The screen portion 24 of the model catcher apparatus is composed of a first series of parallel wire cables 58, the opposite ends of which are looped around a ring cable 60, said ring cable 60 extending through the respective loops 47 formed on the shock absorbing cables 46. A second series of cables 62 intersect the first series of cables 60 at substantially right angles and the ends thereof are looped either about the cables 58 or the ring cable 60. The cables 62 are attached to the cables 58 adjacent the ends of the respective cables 58 in the manner shown in Fig. 4. In each case where one cable is looped about another, said loop is formed by bending the end of the cable around a thimble 48, substantially identical to the thimble used to form the loop at the end of the respective shock absorbing cables 46; after looping said cable around the thimble the free end of the cable is spliced to the adjacent portion of the cable, and the spliced area is wrapped with brass wire. The assembly is then coated with soft solder.

It is pointed out, that in order to provide means to regulate the tautness of the screen 24, each of the respective cables 58 and 62 is composed of two strands joined together by a turnbuckle 66. In order to maintain proper spacing between the respective parallel cables, the spacing thereof is initially adjusted, and each cable is then tied to each other cable that it intersects, by means of suitable wire 64. The cables 58 and 62 are tied together at all points of intersection therebetween, except where either one cable intersects a turnbuckle, or where turnbuckles themselves intersect.

As previously pointed out, the ring cable 60 passes through the eyelets 47 formed at the outermost end of the respective shock absorber cables 46, and in this manner the screen 24 is supported transversely within the wind tunnel 10.

In the event that either a model, or a portion thereof, breaks loose from the model support 16, said model or portion thereof will be blown against the screen 24, and passage thereof through the wind tunnel and into the mechanism contained therein, as for example, the motor and propeller means 12 and 14 respectively, will be prevented. The shock of an object striking the screen 24 is transmitted through the respective strands 58 and 62 to the ring cable 60 which in turn transmits said shock to the shock absorbing cable 46, by virtue of the connection of said ring cable 60 with said shock absorbing cable 46. The cable 46 is therefore drawn outwardly of the housing 26 by the shock of objects striking the screen 24. The movement of the cable 46 out of the housing is resisted by the spring 56 acting upon the disc 52 carried on said cable 46. It is pointed out that when the shock absorber cable 46 moves back and forth in the housing 26, the outer end thereof slides on the curved surface of the anti-friction block 34, rather than against the adjacent edge of the housing, thereby decreasing wear on said cable.

In summation, it is pointed out that the applicants have provided a relatively simple and inexpensive model catcher apparatus for use in a wind tunnel, said apparatus being adapted to prevent the passage of dislodged models and/or portions thereof through the wind tunnel, thereby preventing damage to apparatus contained in said tunnel. Since the model catcher apparatus described above is resilient in nature and is provided with shock absorbing means, it is considerably more resistant to breakage than rigid devices heretofore used in the prevention of the passage of foreign bodies through a wind tunnel.

Obviously many modifications and variations of the present invention are possible in the light of the above teachings. It is therefore to be understood that within the scope of the appended claims the invention may be practiced otherwise than as specifically described.

What is claimed is:

1. A wind tunnel including a model supporting means contained in the throat thereof, means for causing the flow of air through said wind tunnel and past said model support, a screen extending transversely of said wind tunnel and occupying the cross-sectional area thereof, said screen being located downwind of the model support and resiliently attached to the walls of said tunnel.

2. A wind tunnel including a model supporting means in the throat thereof, means for forcing wind through said tunnel and past said model supporting means, a flexible screen extending transversely of said wind tunnel and occupying the cross-sectional area thereof, said screen being located downwind of the model support, whereby it is adapted to catch either a dislocated model or a fragment thereof.

3. In a wind tunnel including a model supporting means, a model catcher apparatus located downwind of the model support and extending transversely of the wind tunnel; said model catcher apparatus comprising a screen, an annular ring cable forming a frame for said screen, said screen comprising a first group of wire cables having their respective ends attached to said ring cable and lying in the plane of said ring cable, a second group of wire cables intersecting said first group of cables and lying substantially in the same plane, and having their respective ends attached to respective ones of said first group of strands adjacent the ends of the latter.

4. In a wind tunnel as set forth in claim 3, wherein said ring cable is attached to a plurality of shock absorber devices attached to the walls of the wind tunnel, said screen member and shock absorbing devices being adapted to absorb the shock of either a dislocated model or a portion thereof, if the latter should strike said screen.

5. In a wind tunnel, a model support, wind producing means, and a model catcher apparatus located downwind of the model support; said model catcher apparatus comprising a screen member located downwind of the model support and extending transversely of the wind tunnel; said screen comprising a ring cable, a plurality of strands of intersecting cable extending across said ring cable; a plurality of shock absorbers affixed to the inner wall of the wind tunnel, said ring cable being attached to said shock absorbers; each shock absorber comprising a tubular housing attached to the wall of the wind tunnel, a shock absorber cable within said housing, extending longitudinally thereof and having one end outside of said housing, resilient means within said housing for preventing withdrawal of said shock absorber cable therefrom, the outer end of said shock absorber cable being attached to said ring cable and extending at substantially right angles to the plane of said screen, whereby the shock of either a dislocated model or a fragment thereof striking said screen will be transmitted to said shock absorbers.

No references cited.